US009674599B2

(12) United States Patent
Zeng et al.

(10) Patent No.: US 9,674,599 B2
(45) Date of Patent: Jun. 6, 2017

(54) HEADPHONES FOR RECEIVING AND TRANSMITTING AUDIO SIGNALS

(71) Applicant: Wearhaus Inc., Berkeley, CA (US)

(72) Inventors: Richie Zeng, Fremont, CA (US); Nelson Zhang, Berkeley, CA (US)

(73) Assignee: Wearhaus, Inc., Berkeley, CA (US)

( * ) Notice: Subject to any disclaimer, the term of this patent is extended or adjusted under 35 U.S.C. 154(b) by 199 days.

(21) Appl. No.: 14/200,916

(22) Filed: Mar. 7, 2014

(65) Prior Publication Data

US 2015/0256920 A1 Sep. 10, 2015

(51) Int. Cl.
*H04R 1/10* (2006.01)
*H04B 3/00* (2006.01)

(52) U.S. Cl.
CPC ..... *H04R 1/1091* (2013.01); *H04R 2201/109* (2013.01); *H04R 2420/07* (2013.01)

(58) Field of Classification Search
CPC ............ H04R 1/1091; H04R 2201/109; H04R 2420/07; H04H 60/80
USPC ............................. 381/74, 309, 311, 80, 2, 6
See application file for complete search history.

(56) References Cited

U.S. PATENT DOCUMENTS 8,126,157 B2 * 2/2012 Buil ........................ G06F 21/10 380/270
2007/0191008 A1 * 8/2007 Bucher ................... G06F 21/10 455/435.2
2011/0245944 A1 * 10/2011 Louboutin ........... G10H 1/0058 700/94
2012/0275618 A1 * 11/2012 Tan ........................ H04H 60/80 381/80
2013/0339859 A1 * 12/2013 Hardi ...................... G06F 3/016 715/728

FOREIGN PATENT DOCUMENTS

TW I 340603 4/2011
TW I 383377 1/2013
TW I 388223 3/2013

OTHER PUBLICATIONS

PCT International Search Report of PCT/US15/18168; dated Jun. 4, 2015; (2 pgs.).
PCT Written Opinion of the International Searching Authority of PCT/US15/18168; dated Jun. 4, 2015; (6 pgs.).

* cited by examiner

*Primary Examiner* — Vivian Chin
*Assistant Examiner* — Ammar Hamid
(74) *Attorney, Agent, or Firm* — DLA Piper LLP (US)

(57) ABSTRACT

Headphones capable of receiving audio signals, playing the audio signals, and transmitting the audio signals to other headphones are disclosed. The headphones comprise a capacitive touch user interface panel and an LED lighting system that optionally can pulse with music played on the headphones. The headphones are coupled to a computing device, such as a smartphone, and can interface with a software application running on the computing device. The computing device in turn can be coupled to a server over a network.

25 Claims, 14 Drawing Sheets

FIGURE 7

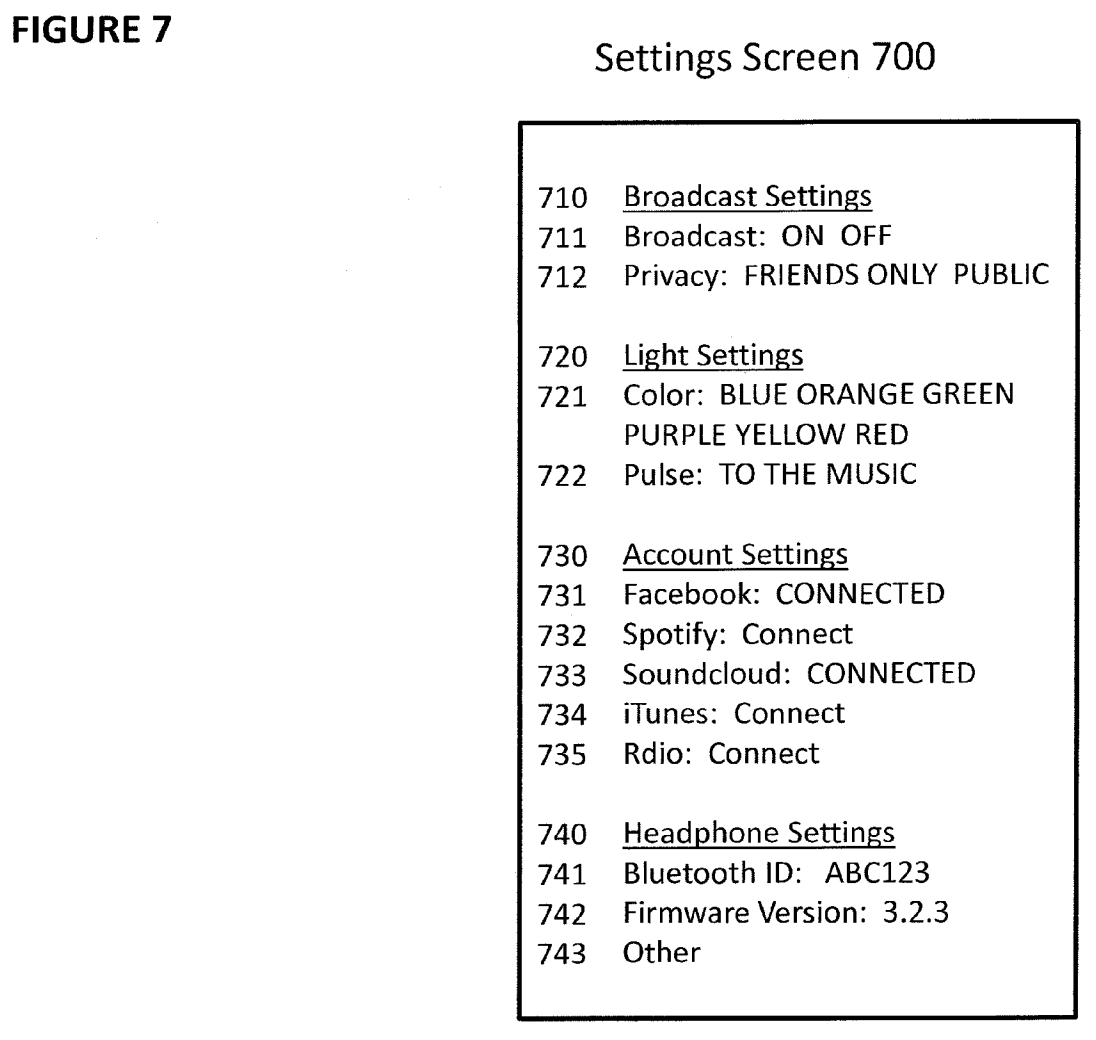

Settings Screen 700

710 <u>Broadcast Settings</u>
711 Broadcast: ON OFF
712 Privacy: FRIENDS ONLY PUBLIC 720 <u>Light Settings</u>
721 Color: BLUE ORANGE GREEN PURPLE YELLOW RED
722 Pulse: TO THE MUSIC 730 <u>Account Settings</u>
731 Facebook: CONNECTED
732 Spotify: Connect
733 Soundcloud: CONNECTED
734 iTunes: Connect
735 Rdio: Connect 740 <u>Headphone Settings</u>
741 Bluetooth ID: ABC123
742 Firmware Version: 3.2.3
743 Other

HEADPHONES FOR RECEIVING AND TRANSMITTING AUDIO SIGNALS

TECHNICAL FIELD

Headphones capable of receiving audio signals, playing the audio signals, and transmitting the audio signals to other headphones are disclosed. The headphones comprise a capacitive touch user interface panel and an LED (light emitting diode) lighting system that optionally can pulse with music played on the headphones. The headphones are coupled to a computing device, such as a smartphone, and can interface with a software application running on the computing device. The computing device in turn can be coupled to a server over a network.

BACKGROUND OF THE INVENTION

Headphones are well-known in the prior art. Headphones typically receive music through a wired connection to the audio source. More recently, wireless headphones have emerged that receive music through a wireless connection to the audio source. In addition, headphones exist that can receive music from an audio source over a wired connection and can then transmit the music over a wireless connection to another headphones.

What is lacking in the prior art are headphones that can receive music over a wireless connection and then transmit the music to a plurality of other headphones over a wireless connection, and for those headphones to then transmit the same music to another plurality of headphones over a wireless connection, and for this receive-and-transmit operation to continue to include all headphones that wish to receive the music.

What also is lacking in the prior art headphones that comprise a capacitive touch user interface panel and that contain lighting systems that can pulse with the music played on the headphones.

SUMMARY OF THE INVENTION

The aforementioned problem and needs are addressed through improved headphones. Disclosed herein are headphones capable of receiving audio signals over a wireless connection, playing the audio signals, and transmitting the audio signals over a wireless connection to other headphones, which in turn can transmit the audio signals over a wireless connection to other headphones, and for this receive-and-transmit operation to continue until all headphones that wish to receive the audio signals are included.

The headphones comprise a capacitive touch user interface panel and an LED lighting system that optionally can pulse with music played on the headphones.

BRIEF DESCRIPTION OF THE DRAWINGS

FIG. 7 depicts a settings screen for an application run on a smartphone for use with headphones.

DETAILED DESCRIPTION OF THE PREFERRED EMBODIMENTS

Figure 1:
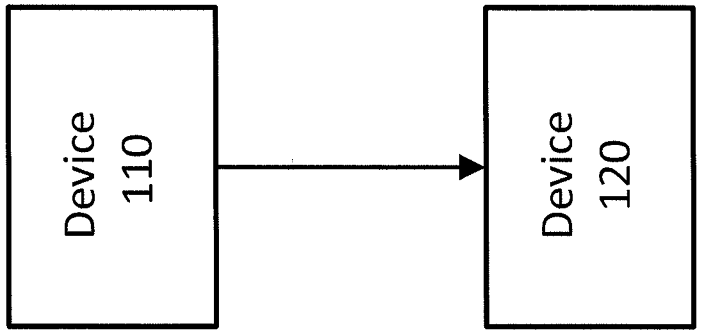
FIGURE 1 (Prior Art)
FIG. 1 depicts prior art headphones that can transmit audio signals to another headphones.

A prior art system is depicted in FIG. 1. Device 110 transmits a wireless audio signal to device 120. Device 110 and device 120 each can be headphones. Notably, device 110 is able to transmit an audio signal to only one other device (device 120), and device 120 is not able to transmit the received audio signal to another device.

Figure 2:
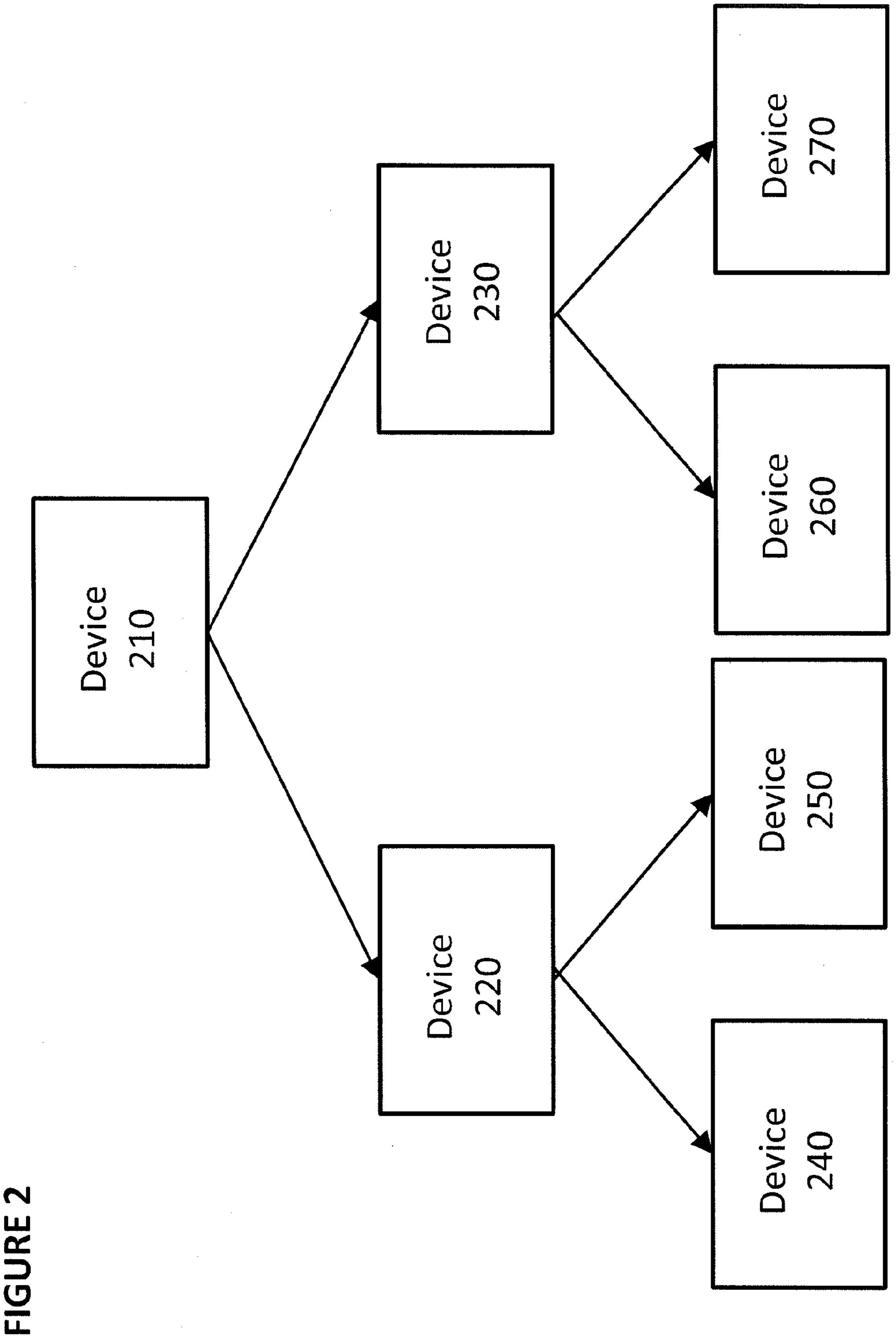
FIG. 2 depicts an embodiment where headphones transmits audio signals to other headphones, which in turn each transmit audio signals to other headphones.

An embodiment is depicted in FIG. 2. Device 210 transmits a wireless audio signal to device 220 and device 230. Device 220 in turn transmits the received wireless audio signal to device 240 and device 250, and device 230 transmits the received wireless audio signal to device 260 and device 270. Devices 240, 250, 260, and 270 in turn could each transmit the received wireless audio signal to other devices (not shown). This process could continue for any number of additional tiers of devices. Devices 210, 220, 230, 240, 250, 260, and 270 can be headphones of the embodiments described below.

In the preferred embodiment, the wireless communication between the devices is performed using Bluetooth. Under current Bluetooth technology, a transmitting device (such as device 210, device 220, and device 230) can transmit a wireless signal to multiple receiving devices, with the number of receiving devices depending upon the bandwidth required for the data. In the example of FIG. 2, each transmitting device transmits to two receiving devices. However, each transmitting device could transmit to more than two receiving devices.

Figure 3:
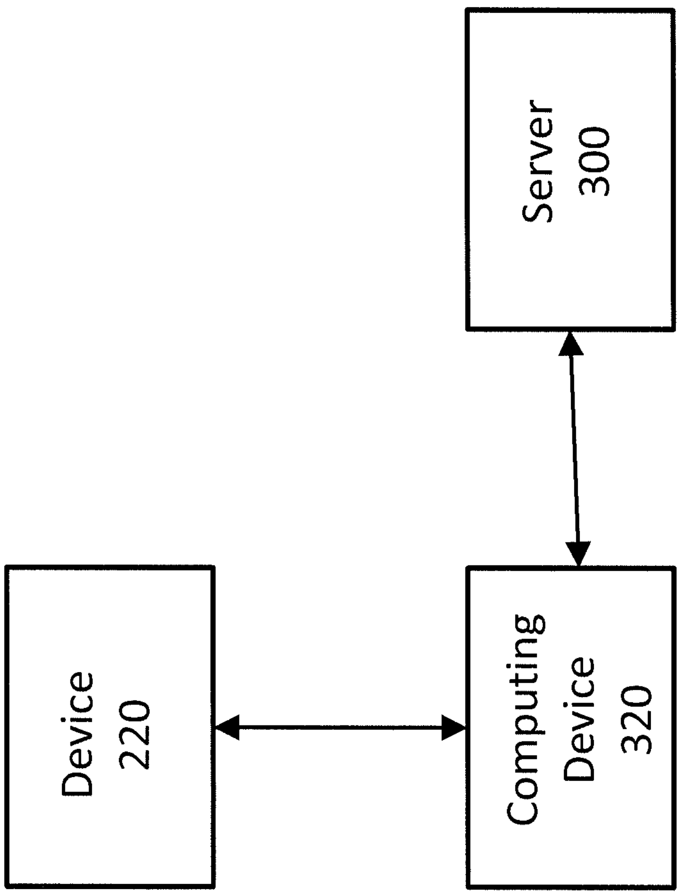
FIG. 3 depicts a system comprising headphones coupled to a smartphone, which in turn is coupled to a server.

With reference to FIG. 3, device 220 again is depicted. Device 220 is coupled to computing device 320. Computing device 320 comprises a processor, memory, and non-volatile storage such as a hard disk drive or flash memory array. Computing device 320 preferably is a smartphone. Computing device 320 also comprises one or more communication interfaces for communicating with device 220 and server 300. For example, computing device 320 might communicate with device 220 over Bluetooth, WiFi, or an audio cable. Computing device 320 might communicate with server 300 using a network interface such as a WiFi interface, 3G or 4G interface, or other known interfaces. Server 300 comprises a processor, a network interface, memory, and non-volatile storage such as a hard disk drive or flash memory array.

Figure 4:
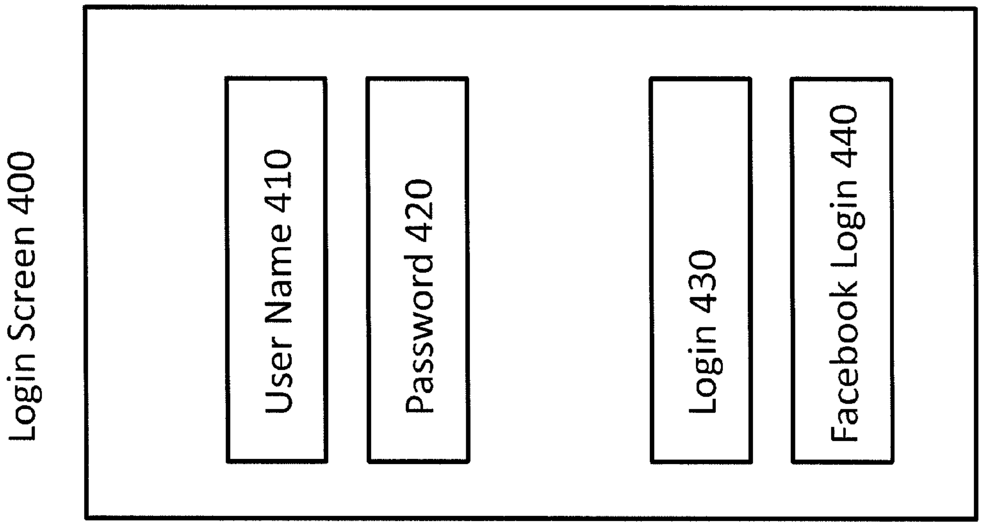
FIG. 4 depicts a login screen for an application run on a smartphone for use with headphones.

Computing device 320 optionally can help facilitate the use of device 220. In FIG. 4, an exemplary login screen 300 for computing device 320 is shown. Login screen 300 is generated by a software application running on computing device 320 and comprises user interface input devices including a user name input device 410 and password input device 420. User name input device 410 receives a user name, and password input device 420 receives a password. Once a user has entered that information, he or she can select the login button 430. In the alternative, a user can login using facebook credentials by selecting the facebook login button 440.

Figure 5:
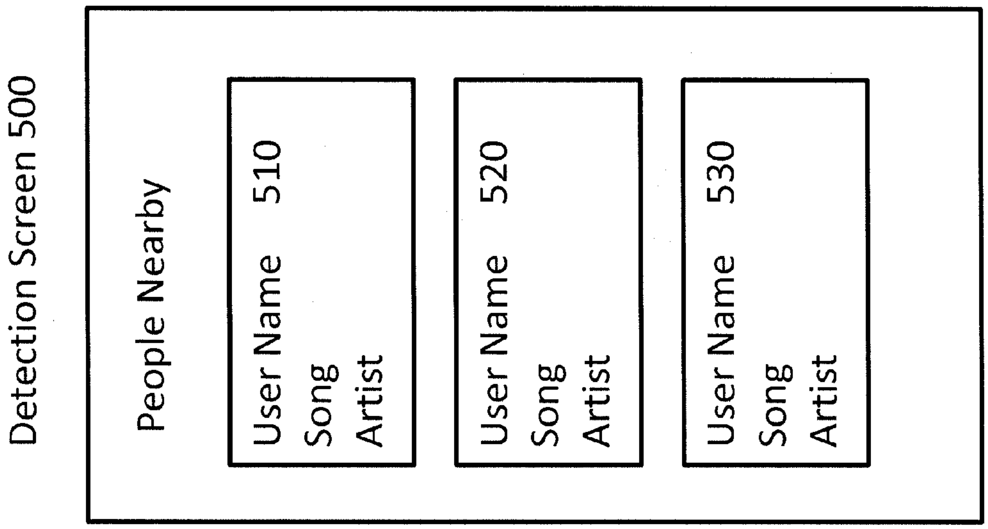
FIG. 5 depicts a detection screen for an application run on a smartphone for use with headphones.

Once a user logs on to the software application, he or she can access exemplary detection screen 500 shown in FIG. 5. Detection screen 500 is generated by the software application. Detection screen 500 identifies "People Nearby" with whom device 220 can interact. In this example, three other people, each using devices that can communicate with device 220, are detected. Object 510 displays user name, song, and artist information about a first detected device. Object 520 displays user name, song, and artist information about a second detected device. Object 530 displays user name, song, and artist information about a third detected device. In this example, the devices are detected by device 220 using standard Bluetooth detection techniques. Device 220 receives the user name, song, and artist information from the devices associated with those users using standard Bluetooth techniques. Thus, detection screen 500 enables the user of device 220 to see which songs it could elect to receive from other devices.

Figure 6:
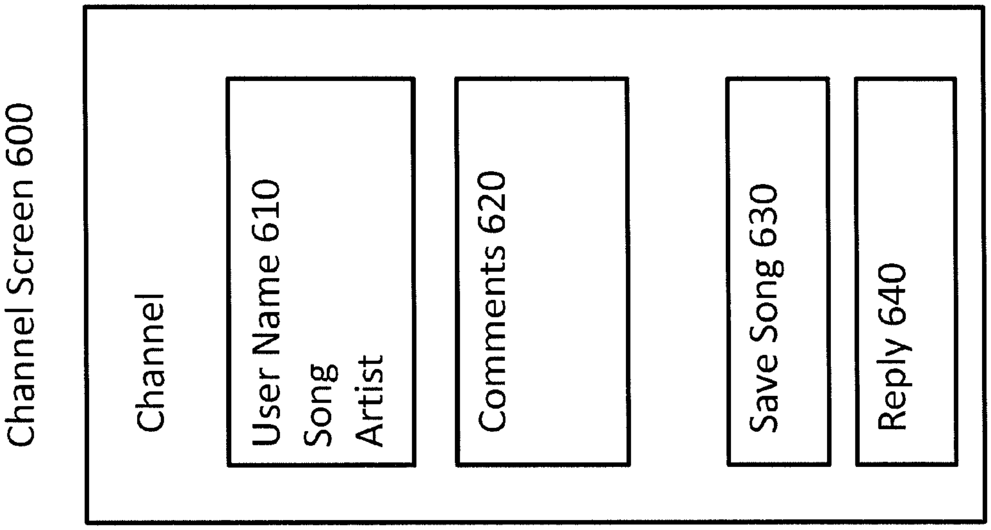
FIG. 6 depicts a channel screen for an application run on a smartphone for use with headphones.
Figure 8:
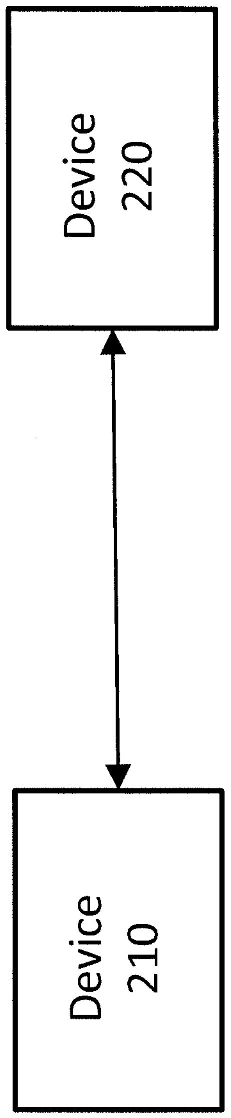
FIG. 8 depicts two headphones in communication with one another.

When a user selects one of the songs, channel screen 600 in FIG. 6 is generated. For purposes of illustration, it is assumed the user of device 220 has selected the song being transmitted by device 210. Channel screen 600 displays information specific to the device that corresponds to the song and user that were selected. In this example, object 610 displays the selected user name, song, and artist. Device 220 will begin receiving the song from the transmitting device and will begin playing it for the user. The user then has the option of viewing comments regarding the song posted by other users in comments box 620. The user can post his or her own comments using the reply button 640. The user also the option of saving the song metadata locally on device 220 using the save song button 630.

FIG. 7 depicts exemplary settings screen 700. Settings screen. 700 displays broadcast settings 710. The user can decide to broadcast to other devices or to not do so using broadcast input device 711. The user also can decide to broadcast publicly or only to friends using privacy input device 712.

Settings screen 700 displays light settings. The user can choose the color of the light to be emitted from device 220, discussed in more detail below, using color selection input device 721. In this example, the light options include blue, orange, green, purples, yellow, and red. The user also can instruct device 220 to pulse to the music or to not pulse to the music using pulse input device 722.

Settings screen 700 displays account settings 730. The user can connect to various music sources and social networks using facebook input device 731, Spotify input device 732, Soundcloud input device 733, iTunes input device 734, and Rdio input device 735. These obviously are examples only, and other music sources and social networks can instead be displayed.

Settings screen 700 also displays headphone settings 740. It displays Bluetooth ID field 741, firmware version field 742, and other fields 743.

When the user of device 210 elects to connect with device 210 (such as by using detection screen 500, described above), device 210 and device 220 will be coupled via Bluetooth technology or other wireless technology. Device 210 then can transmit the song to device 220, and device 220 can receive the song and play it for the user of device 220.

Figure 9:
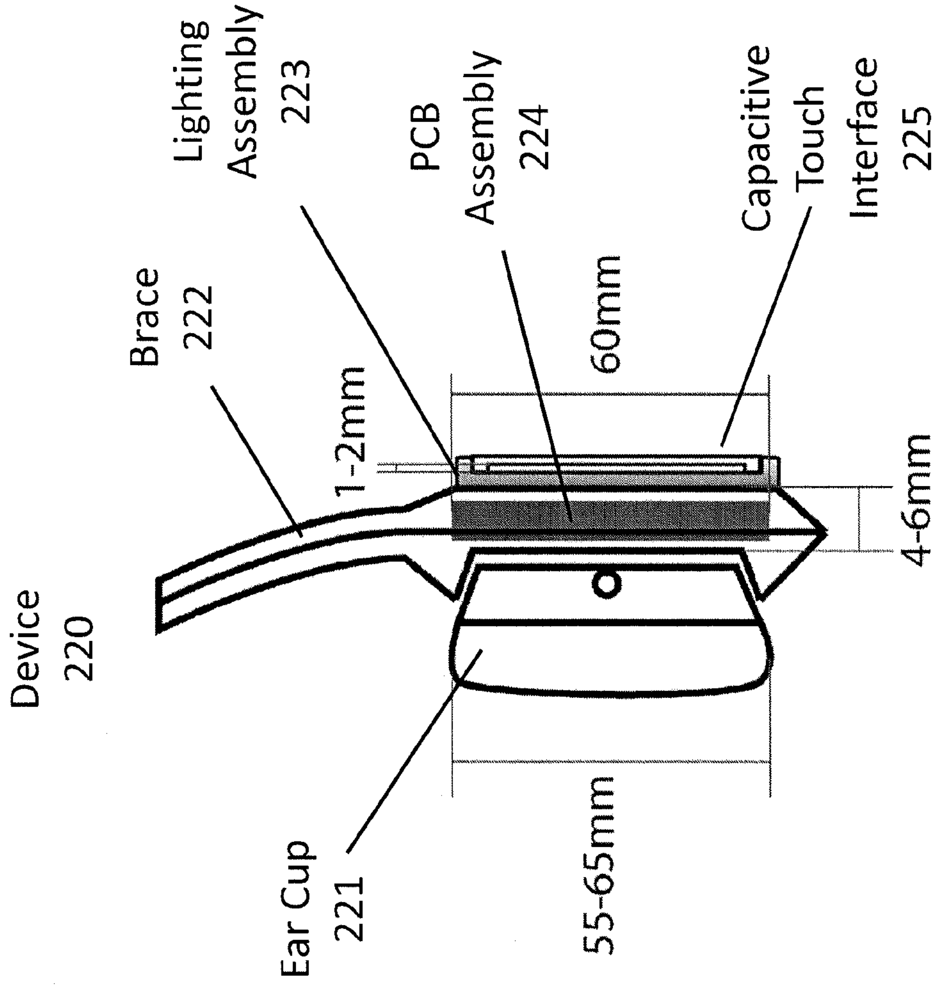
FIG. 9 depicts a view of a portion of a headphones.

With reference to FIG. 9, an embodiment of device 220 is shown. The same embodiment can be used for devices 210, 230, 240, 250, 260, and 270 described previously. Here, device 220 is headphones. FIG. 9 depicts a back view of a portion of device 220. Shown here, device 220 comprises an ear cup 221, brace 222 (which connects to another ear cup, not shown), lighting assembly 223, PCB assembly 224, and capacitive touch interface 225. Ear cup 221 comprises a sound generation device (not shown).

Figure 10:
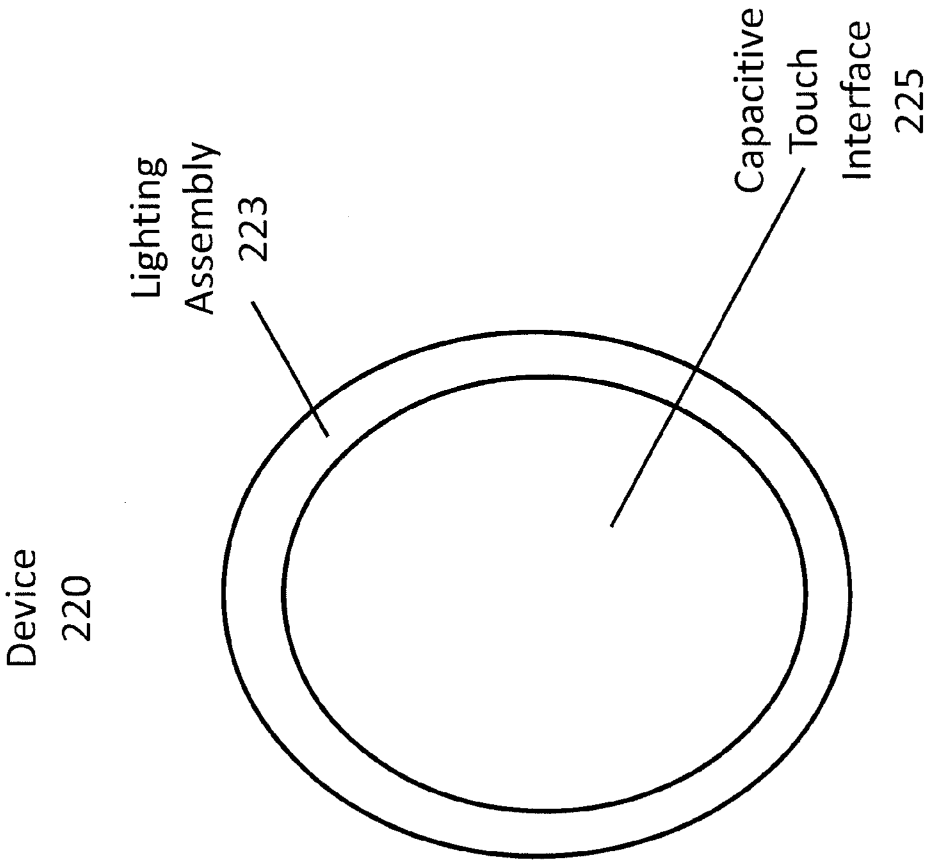
FIG. 10 depicts a side view of a portion of the headphones.

With reference to FIG. 10, a side view of a portion of device 220 is shown. Here, lighting assembly 223 and capacitive touch interface 225 are shown. Capacitive touch interface 225 enables device 220 to act as a "touch screen," and a user can provide input to device 220 using capacitive touch interface 225. For example, swiping a finger upward might increase the volume of device 220, and swiping a finger downward might decrease the volume of device 220. Tapping the middle of the capacitive touch interface 225 might stop the playing of the audio signal.

Figure 11:
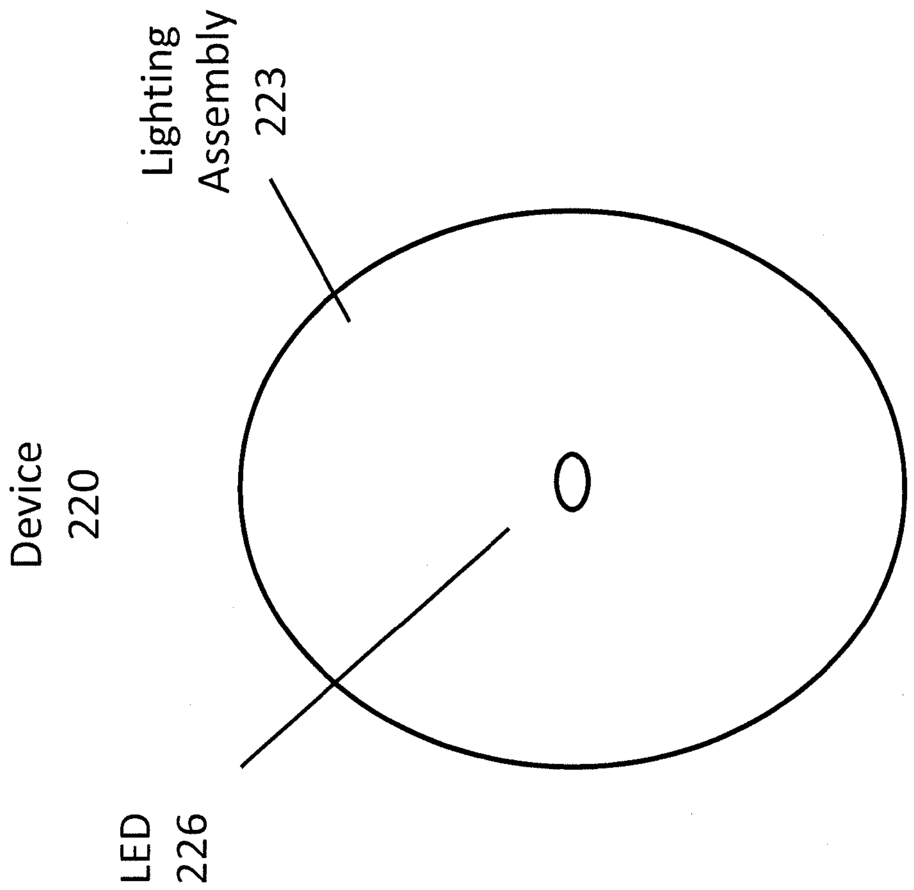
FIG. 11 depicts a lighting assembly within headphones.
Figure 12B:
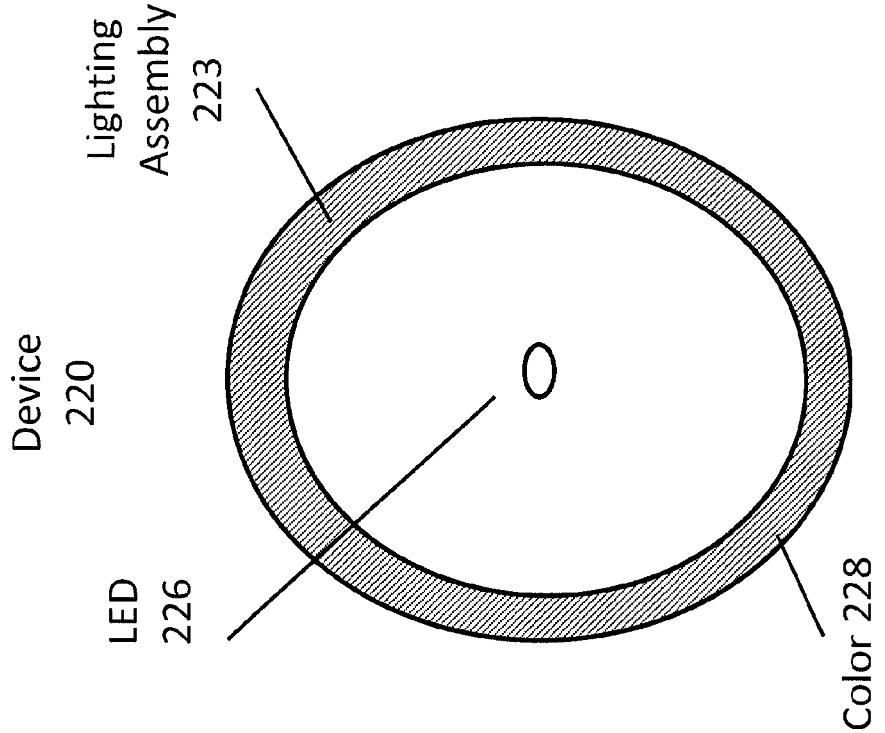
FIGS. 12A and 12B depict different colors generated by a lighting assembly of within headphones.
Figure 12A:
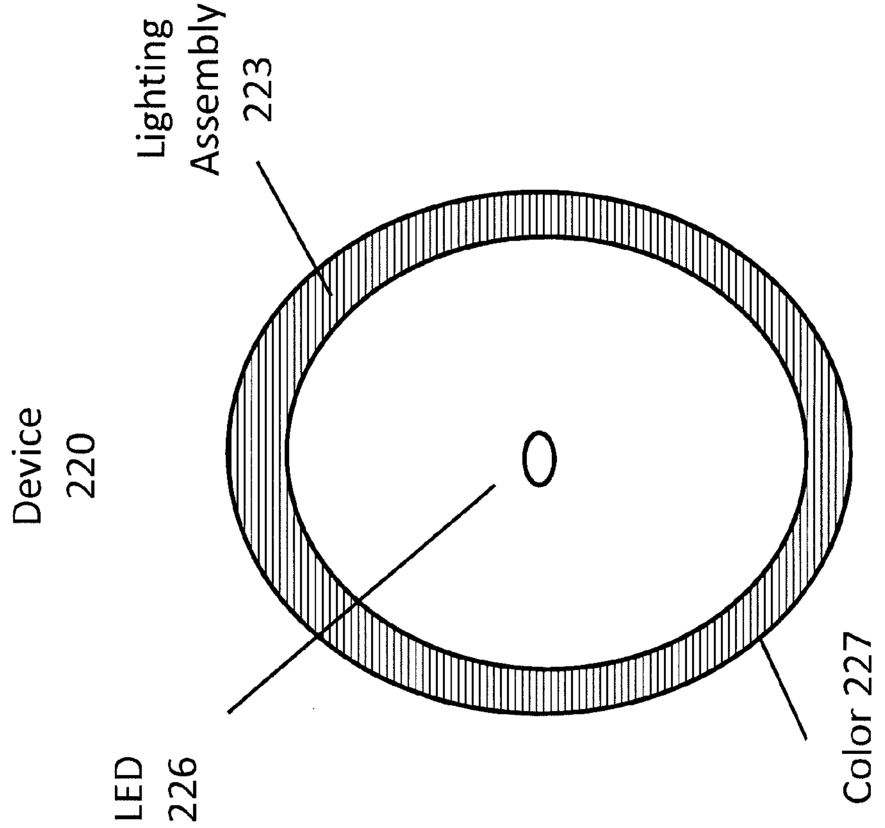

With reference to FIG. 11, a side view of lighting assembly 223 is shown. Lighting assembly 223 comprises one or more of LED 226. LED 226 preferably is an RGB LED that can emit combinations of red, green, and blue light, resulting in a plurality of different possible colors (such as blue, orange, green, purple, yellow, and red, as shown in settings screen 700 of FIG. 7). In FIG. 12A, LED 226 is configured by input signals to generate the color 227, such that device 220 will emit the color 227 from lighting assembly 223. The input signals vary the hue and intensity of each of the red, blue, and green components of LED 226 to generate color 227. In FIG. 12B, LED 226 is configured by input signals to generate color 228, such that device 220 will emit the color 228 from lighting assembly 223. The input signals vary the hue and intensity of each of the red, blue, and green components of LED 226 to generate color 228. In FIGS. 12A and 12B, light from LED 226 diffuses to the edges of lighting assembly 223 and appears to the user as a lighted ring around capacitive touch interface 225. One of ordinary skill in the art will understand that the light from LED 226 can appear to the user in any number of different shapes and designs through the use of translucent and opaque materials to generate the shapes and designs.

Optionally, lighting assembly can be controlled in such a manner that LED 226 turns on and off in response to the music being played by device 220. This can be done, for example, by performing a Fast Fourier Transform on the music to generate frequency information regarding the music and generating a voltage that varies in response to the magnitude of a selected frequency (such as a low frequency that comprises the "bass" sounds of the music) to be used to control LED 226. Thus, if the music has a heavy beat, LED 226 might pulse in response to the beat.

Figure 13:
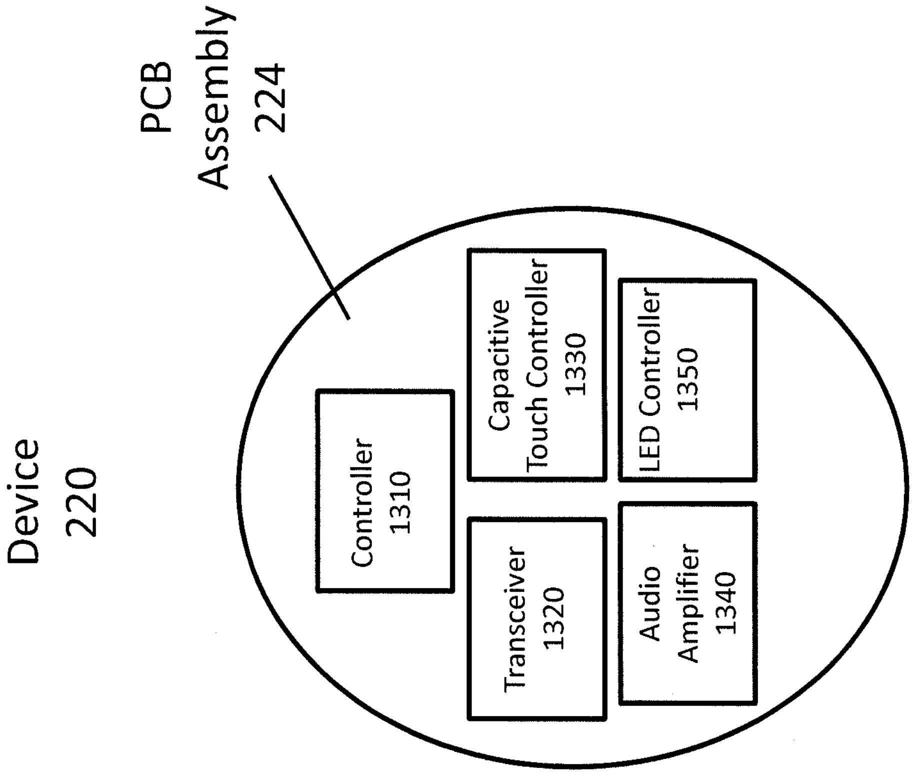
FIG. 13 depicts a PCB assembly within headphones.

With reference to FIG. 13, a functional view of PCB assembly 224 is depicted. PCB assembly 224 comprises controller 1310, transceiver 1320, capacitive touch controller 1330, audio amplifier 1340, and LED controller 1350. Controller 1310 runs firmware that generates the user interface shown in FIGS. 4-7 and that handles certain aspects of the communication with other devices. Transceiver 1320 is an RF transmitter and receiver that engages in wireless communication, for example, Bluetooth communication. Transceiver 1320 runs firmware that implements the tree networking structure between devices described previously. Capacitive touch controller 1330 controls and interacts with capacitive touch interface 225. Audio amplifier 1340 performs amplification of audio signals that are received from another device or that emanate from computing device 320. LED controller 1350 controls lighting assembly 223 and LEDs 226.

With reference again to FIG. 2, device 210 is transmitting music that it receives from its coupled computing device (which is similar to computing device 320). Device 220 and device 230 each are instructed to receive the music of device 210, and receive and play the music for their users. Device 220 in turn transmits the music using transceiver 1320 to devices 240 and 250, and device 230 transmits music using its transceiver (similar to transceiver 1320) to device 260 and device 270.

Figure 14:
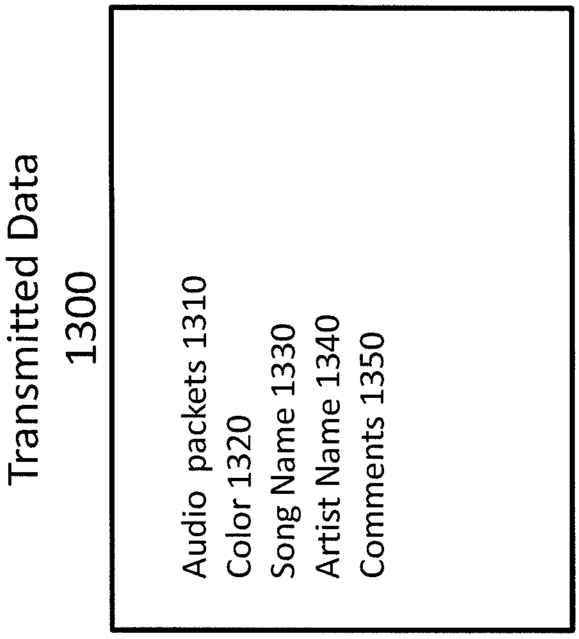
FIG. 14 depicts exemplary types of data that is sent from one device to another.

With reference to FIG. 14, a depiction of the types of transmitted data 1300 that are transmitted from one device to another (such as from device 210 to device 220) is shown. Transmitted data 1300 comprises audio packets 1310, color information 1320, song name 1330, artist name 1340, and comments 1350. Audio packets 1310 contain the music or audio data. Color information 1320 indicates the color being generated by the lighting assembly of the transmitting device (such as device 210). This allows all of the devices who are receiving the audio signal that originally emanates from device 210 to all generate the same color from their lighting assemblies. This can be a fun feature, for example, if a plurality of users and their devices receive the song and all select the "pulse" option for their lighting assemblies. Song name 1330 is the name of the song being transmitted, and artist name 1340 is the name of the artist of the song. Comments 1350 can comprise comments from users regarding the music, such as comments 620 in FIG. 6.

When device 220 receives transmitted data 1300 from device 210, transceiver 1320 receives the wireless signal and generates digital data from the wireless signal, and controller 1310 processes the digital data and generates an audio signal that is amplified by audio amplifier 1340 and played for the user of device 220. Controller 1310 concurrently transmits transmitted data 1300 to devices 240 and 250 using transceiver 1320. Optionally, a second transceiver (or a transmitter) can be used for this purpose instead of transceiver 1320. Controller 1310 also performs the Fast Fourier Transform analysis described previously on the audio data (audio packets 1310) and send that information to LED controller 1350, which can then cause lighting assembly 223 to pulse in response to the music.

References to the present invention herein are not intended to limit the scope of any claim or claim term, but instead merely make reference to one or more features that may be covered by one or more of the claims. Structures, processes and numerical examples described above are exemplary only, and should not be deemed to limit the claims. It should be noted that, as used herein, the terms "over" and "on" both inclusively include "directly on" (no intermediate materials, elements or space disposed there between) and "indirectly on" (intermediate materials, elements or space disposed there between).

What is claimed is:

1. A method of receiving, selecting, playing, and transmitting an audio signal, comprising: receiving, by a first headphones apparatus, an a plurality of sets of audio data, each set of audio data associated with an audio signal and sent by a different transmitter, through a first wireless interface, wherein one or more of a song name and an artist name can be derived from each set of audio data; displaying, on a computing device coupled to the first headphones apparatus, the song name or the artist name derived from each set of audio data within the plurality of sets of audio data; receiving, by the first headphones apparatus, a user command to receive a selected audio signal associated with one set of audio data from the plurality of sets of audio data; playing, by the first headphones apparatus, the selected audio signal; transmitting, by the first headphones apparatus, the set of audio data for the selected audio signal through the first wireless interface; displaying, on a computing device coupled to a second headphones apparatus, the song name or artist name derived from the set of audio data for the selected audio signal; receiving, by the second headphones apparatus, a user command to receive the selected audio signal; receiving, by the second headphones apparatus, the selected audio signal over a second wireless interface; playing, by the second headphones apparatus, the selected audio signal; and transmitting, by the second headphones apparatus, the set of audio data for the selected audio signal over the second wireless interface.

2. The method of claim 1, comprising the step of: providing, by the first headphones apparatus, a capacitive touch interface.

3. The method of claim 1, wherein the receiving step by the first headphones apparatus comprises communicating with a smartphone.

4. A method of receiving, playing, and transmitting an audio signal, comprising: receiving, by a first headphones apparatus, a plurality of sets of audio data, each set of audio data associated with an audio signal and received from a different transmitter, through a first wireless connection interface; receiving, by the first headphones apparatus, a command from a user that identifies a selected audio signal associated with one set of audio data from among the plurality of sets of audio data; playing, by the first headphones apparatus, a selected audio signal; transmitting, by the first headphones apparatus, a set of audio data for the selected audio signal over the first wireless interface; displaying, on a computing device coupled to a second headphones apparatus, one or more of song name and artist name derived from the set of audio data for the selected audio signal; receiving, by the second headphones apparatus, a user command to receive the selected audio signal; receiving, by the second headphones apparatus, the selected audio signal over a second wireless interface; playing, by the second headphones apparatus, the selected audio signal; transmitting, by the second headphones apparatus, the set of audio data for the selected audio signal over the second wireless interface; generating, by the first headphones apparatus, a light that changes in response to the selected audio signal; and generating, by the second headphones apparatus, a light that changes in response to the selected audio signal.

5. The method of claim 4, wherein the generating by the first headphones and the second headphones is performed by a light emitting diode (LED) on each.

6. The method of claim 5, wherein the generating by the first headphones and the second headphones comprises pulsing the LED on each in response to the audio signal.

7. The method of claim 1, further comprising the step of: transmitting, by the second headphones apparatus, the set of audio data for the selected audio signal to a third headphones apparatus over the second wireless interface.

8. The method of claim 1, wherein the first wireless interface, and the second wireless interface, each comprises a Bluetooth interface.

9. A headphones apparatus, comprising: a transceiver for receiving a plurality of sets of audio data, each set of audio data associated with an audio signal and received from a different transmitter, over a wireless interface and for transmitting one of the plurality of sets of audio data and its associated audio signal to a plurality of other headphones apparatuses over a the wireless interface; a controller for processing a selected audio signal associated with one set of audio data from among the plurality of sets of audio data to generate sound; a control interface for receiving user commands; and a lighting assembly for generating light that changes in response to the selected audio signal.

10. The apparatus of claim 9, wherein the control interface is a capacitive touch interface.

11. The apparatus of claim 9, wherein the computing device is a smartphone.

12. The apparatus of claim 9, wherein the lighting assembly comprises a light emitting diode (LED).

13. The apparatus of claim 12, wherein the controller is configured to pulse the LED in response to the selected audio signal.

14. The apparatus of claim 9, wherein the wireless interface, comprises a Bluetooth interface.

15. The apparatus of claim 11, wherein the smartphone generates a user interface displaying the set of audio data.

16. The apparatus of claim 15, wherein the audio data associated with the selected audio signal comprises song name and artist name.

17. The method of claim 1, further comprising: displaying, on a third headphones apparatus, the set of audio data for the selected audio signal; receiving, by the third headphones apparatus, a user command to play the selected audio signal; and playing, by the third headphones apparatus, the selected audio signal.

18. The method of claim 2, comprising the step of: changing the volume of the playing of the selected audio signal on the first headphones apparatus in response to input received by the capacitive touch interface.

19. The method of claim 4, wherein light is generated in the first headphones apparatus and the second headphones apparatus by LEDs of colors comprising blue, orange, green, purple, yellow, and red.

20. The method of claim 4, wherein the set of audio data for the selected audio signal further comprises light color data.

21. The method of claim 20, wherein the light generated by the second headphones apparatus is the same color as the light generated by the first headphones apparatus and is generated based on the light color data.

22. The apparatus of claim 9, wherein the capacitive touch interface allows a user to change the volume of the sound.

23. The apparatus of claim 9, wherein the lighting assembly comprises LEDs of a plurality of colors.

24. The apparatus of claim 9, wherein the set of audio data for the selected audio signal further comprises light color data.

25. The method of claim 4, further comprising: receiving, by a third headphones apparatus, the set of audio data associated with the selected audio signal from the second headphones apparatus; playing, by the third headphones apparatus, the selected audio signal; receiving, by a fourth headphones apparatus, the set of audio data for the selected audio signal from the second headphones apparatus; and playing, by the fourth headphones apparatus, the selected audio signal.

* * * * *